United States Patent [19]

Miyoshi

[11] Patent Number: 4,897,536
[45] Date of Patent: Jan. 30, 1990

[54] OPTICAL AXIS DISPLACEMENT SENSOR WITH CYLINDRICAL LENS MEANS

[75] Inventor: Takashi Miyoshi, Sapporo, Japan

[73] Assignees: Okada Inc., Shizuoka; Kohgakusha Engineering Co., Ltd., Sapporo, both of Japan

[21] Appl. No.: 154,198

[22] Filed: Feb. 10, 1988

[30] Foreign Application Priority Data

Feb. 10, 1987 [JP] Japan ................... 62-27084

[51] Int. Cl.⁴ .................. G01J 1/20; G01N 21/86
[52] U.S. Cl. ..................... 250/201; 250/561; 356/1
[58] Field of Search ............ 356/1, 4, 375, 376, 356/378, 381; 250/201, 561, 560; 354/403, 404

[56] References Cited

U.S. PATENT DOCUMENTS

| | | | |
|---|---|---|---|
| 3,617,128 | 11/1971 | Harvey | 356/4 |
| 3,623,811 | 11/1971 | Lederer | 356/4 |
| 4,204,772 | 5/1980 | Balasubramanian | 356/1 |
| 4,211,922 | 7/1980 | Vaerewyck et al. | 250/203 R |
| 4,412,746 | 11/1983 | Yokouchi | 250/227 |
| 4,548,504 | 10/1985 | Morander | 356/375 |
| 4,645,347 | 2/1987 | Rioux | 356/376 |
| 4,711,999 | 12/1987 | Shishido et al. | 250/201 |
| 4,717,819 | 1/1988 | Momiyama et al. | 356/4 |
| 4,753,528 | 6/1988 | Hines et al. | 356/1 |
| 4,767,934 | 8/1988 | Stauffer | 250/561 |

FOREIGN PATENT DOCUMENTS

| | | |
|---|---|---|
| 0071667 | 2/1983 | European Pat. Off. . |
| 0234562 | 9/1987 | European Pat. Off. . |
| 0248479 | 12/1987 | European Pat. Off. . |
| 2177793 | 1/1987 | United Kingdom . |

OTHER PUBLICATIONS

Eighth International Conference on Pattern Recognition, Paris, 27-31 Oct. 1986; pp. 220-225; "3-D Model Reconstruction and Processing for CAE"; M. Idesawa. Japanese Patent Abstracts, 61-155905(A), vol. 10, No. 358 (P.522) [2415], 12/2/86.

Primary Examiner—David C. Nelms
Assistant Examiner—Michael Messinger
Attorney, Agent, or Firm—Oblon, Spivak, McClelland, Maier & Neustadt

[57] ABSTRACT

Disclosed herewith is an optical axis displacement sensor, which has a convex lens having a hole on the optical axis, a light shielding plate having a hole on the optical axis and two parallel straight slits, a laser light source for irradiating a laser beam on a target surface through the holes of the light shielding plate and the convex lens, a CCD line sensor provided in parallel to the light shielding plate, perpendicular to the optical axis and perpendicular to the two straight slits, a cylindrical lens provided between the light shielding plate and the CCD line sensor, and a calculation unit for calculating the displacement of the target surface from the focal point of the convex lens, using the output of the CCD line sensor.

5 Claims, 7 Drawing Sheets

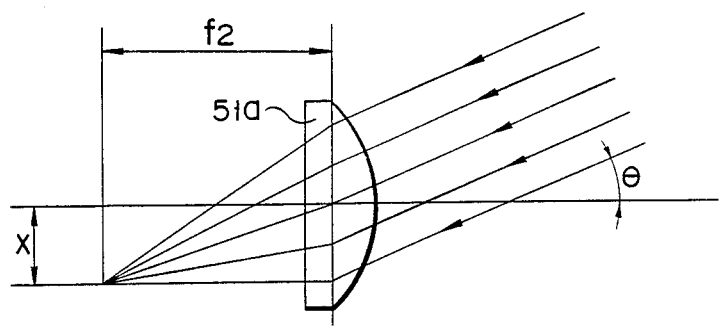
F I G. 11
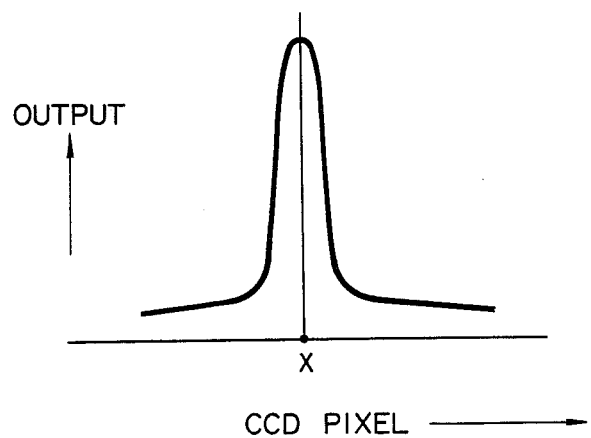
F I G. 12

OPTICAL AXIS DISPLACEMENT SENSOR WITH CYLINDRICAL LENS MEANS

BACKGROUND OF THE INVENTION

I. Field of the Invention

This invention relates to an optical axis displacement sensor.

II. Description of the related art including information disclosed under §§1.97-1.99

Recently, position-sensing apparatuses for measuring the displacement of a surface have been developed for loading numerical data representing a three-dimensional free-form surface having a complicated shape. These apparatuses can be classified into two types. The first type measures the distance to a surface by use of the principle of triangulation. The second type has a photoelectric converter and can be moved by a servo mechanism. The photoelectric converter detects the displacement of an image of a surface which has resulted from the displacement of the surface with respect to a reference point. The apparatus is then moved by a servo mechanism until the displacement of the image is compensated, and finds the position of the surface from the distance it has been moved.

FIG. 1 shows a conventional apparatus of the first type. The apparatus has angle detector 12. Detector 12 comprises calibrating disk 11, and has a telescope, a slit plate and a photoelectric converter, all attached to disk 11. A laser beam emitted from a laser (not shown) is reflected at point P on surface S, and is incident onto angle detector 12. When surface S is shifted for distance $\Delta z$ along the laser beam emitted from the laser, the angle of reflection of the beam varies. The angular variation $\Delta\theta$ detected by detector 12 is given as:

$$\Delta\theta = \Delta z . \sin\phi / R \quad (1)$$

where $\phi$ represents the angle of an incident laser beam with respect to a line joining point P, before displacement, with the center of disk 11, and R represents the distance between point P, before displacement, and the center of disk 11.

When variation $\Delta\theta$ is obtained by detector 12, displacement $\Delta z$ of surface S can be calculated by way of the above equation (1).

FIG. 2 shows a knife-edge type positioning sensor of the second conventional apparatus. Positioning sensor 14 has micro-mirror 3 for reflecting a slightly diverged laser beam onto the otical axis of convex lens 2, knife-edge shielding plate 15 having a knife edge perpendicularly crossing the optical axis, at an image point Q of a point P, and photodetecting diodes 16a, 16b positioned symmetrically with respect to a plane defined by the optical axis and the knife edge. Sensor 14 is moved by a servo mechanism (not shown), the distance travelled being detected.

The apparatus is so adjusted that, when surface S is inclined in a plane including point P (i.e., when the image point is located at point Q), a differential output Ea-Eb of diodes 16a and 16b becomes zero. When surface S moves from the plane including point P, whereby the image point is shifted from point Q, part of the light incident on either one of diodes 16a and 16b is shielded by plate 15, so that the output Ea-Eb does not become zero. The servo mechanism moves sensor 14 such that the differential output becomes zero, and the degree of displacement from the plane including point P of surface S can be known by measuring the distance sensor 14 moved.

As can be understood from equation (1), in the apparatus of FIG. 1, $\Delta\theta$ reaches its maximum when $\phi$ is $\pi/2$, provided $\Delta z$ remains unchanged. Therefore, detector 12 should be so positioned that its detection face is perpendicular to the laser beam. In this case, however, a so-called "shadow effect" may occur wherein the light reflected from surface S is shielded by a projection protruding from detector 12 when surface S is shifted greatly as is shown in FIG. 3. Thus, a dead angle occurs, and the displacement of surface S cannot be correctly measured.

The knife-edge type sensor shown in FIG. 2 has the following drawbacks with regard to its incorporation in an optical system and the signal processing.

Plate 15 must be positioned at image point Q of point P in the optical system. To this end, the position of point Q must first be defined. As is apparent from the principle of reversibility, micromirror 3 must be designed and adjusted so as to reflect the beam applied from the light source and convert the beam to divergent light flux L represented by broken lines joining point Q with some points on the surface of mirror 3. In other words, since the position of point Q (and hence point P) depends upon the optical system of the light source, the design, assembling and adjustment become complicated. Therefore, not only does the cost of the device increase, but it is also difficult to operate.

To eliminate such drawbacks, it is considered that point P depends upon the sole optical constant For example, when parallel light beams are incident from a light source onto mirror 3, point P becomes the focal point of lens 2, and does not accordingly depend upon other optical constants. However, in this case, a new problem may arise that image point Q (and hence the position of shielding plate 15) becomes infinitely remote.

As the rules of geometrical optics show, in the system of FIG. 2, no linearity exists between the positional changes of surface S and the that of image point Q. It is therefore difficult for a photoelectric converter to generate an output which quantitatively corresponds to the displacement of surface S. Since the light beams incident onto surface S are not parallel, the light-receiving area varies as surface S is displaced from the plane including point P, with the result that the size of the image alters, thereby giving rise to the drawback wherein the precise measurement of the displacement in a wide range is disabled.

Since the position of surface S where the differential output of diodes 16a and 16b becomes zero is located at point P, the absolute amount of light incident onto the diodes does not necessarily pose a problem with regard to signal processing. Hence, as long as the apparatus is used as a reference-pointing sensor, neither a variation in the incident energy of the diodes, generated by variations in the reflectivity of surface S and in the luminous intensity of the light source, nor an external disturbance such as an optical noise becomes a significant problem. In this sense, this apparatus is preferable, but another disadvantage of this apparatus resides in its employment of the servo mechanism. If the displacement of surface S is measured only with the apparatus in FIG. 2, without servo mechanism, the relationship between the displacement of surface S and the displacement of the image point becomes complicated. Since the measured result depends upon the difference of luminous quantities incident to diodes 16a and 16b, this apparatus has such disadvantages that each measured result cannot be identical to any other measured result due to the difference in the reflectivity of surface S and the external disturbance.

Further, the other drawback of the apparatus in FIG. 2 is that, if surface S is not perpendicular to the optical axis, the apparatus does not correctly function. Since shielding plate 15 and diodes 16a, 16b correctly operate on the basis that the intensity distribution of lights incident from lens 2 to knife edge is symmetrical with respect to the optical axis, if surface S is inclined with respect to the optical axis, the intensity distribution of the reflected light does not become axis-symmetrical.

SUMMARY OF THE INVENTION

With the above circumstances in mind, therefore, it is an object of this invention to provide an optical axis displacement sensor which can measure the displacement of a target surface to be measured in a wide range and in a non-contact manner with high accuracy and without causing a dead angle (shadow effect), even if the target surface is a three-dimensional free-form surface with a complicated shape and the reflection factor, roughness and radius of curvature of the target surface and the inclination of a reflecting surface vary at different points on the target surface.

An optical axis displacement sensor according to this invention comprises a light source for generating parallel light beams; a convex lens for irradiating the parallel light beams from the light source on a target surface; a light shielding plate having a slit and provided perpendicular to the optical axis and on an opposite side of the target surface with respect to the convex lens; a cylindrical lens provided in parallel to the light shielding plate for converging light beams reflected from the target surface which have passed through the slit; a line sensor, disposed in parallel to the light shielding plate, for receiving light beams converged by the cylindrical lens so as to detect a reception position of the light beam having passed through the slit; and a calculation unit for calculating a displacement of the target surface from a focal point of the convex lens in accordance with the position detected by the line sensor.

BRIEF DESCRIPTION OF THE DRAWINGS

FIG. 11 shows the details of the cylindrical lens shown in FIG. 10; and

FIG. 12 is a diagram illustrating the output of a CCD line sensor used in the second embodiment.

DETAILED DESCRIPTION OF THE PREFERRED EMBODIMENT

An optical axis displacement sensor according to a first embodiment of this invention will be explained below, referring to FIGS. 4 to 6.

Figure 1:
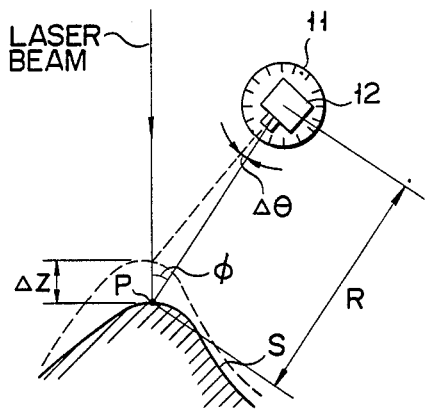
FIG. 1 is a block diagram of a conventional displacement sensor based on a triangulation method.
Figure 2:
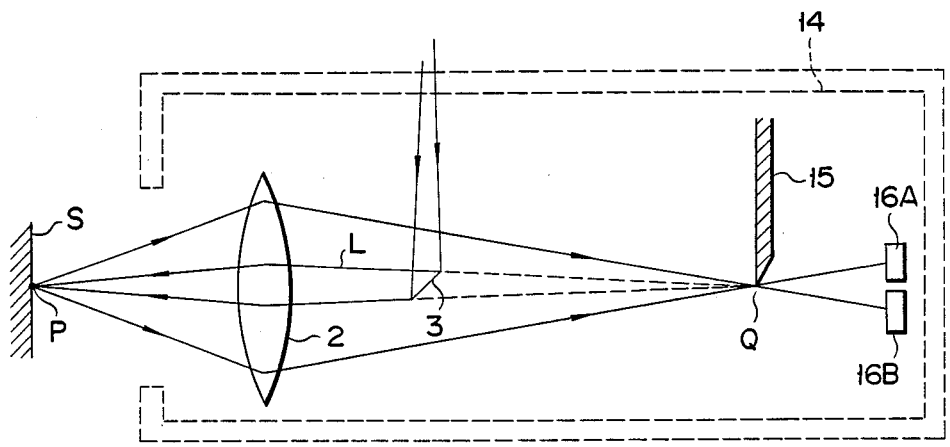
FIG. 2 is a block diagram of a conventional displacement sensor of a knife-edge type.
Figure 3:
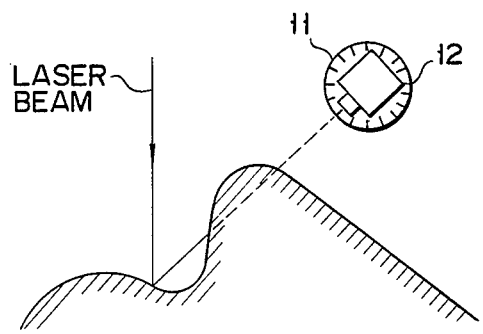
FIG. 3 is a diagram for explaining a shadow effect caused by the conventional displacement sensor as shown in FIG. 1.
Figure 4:
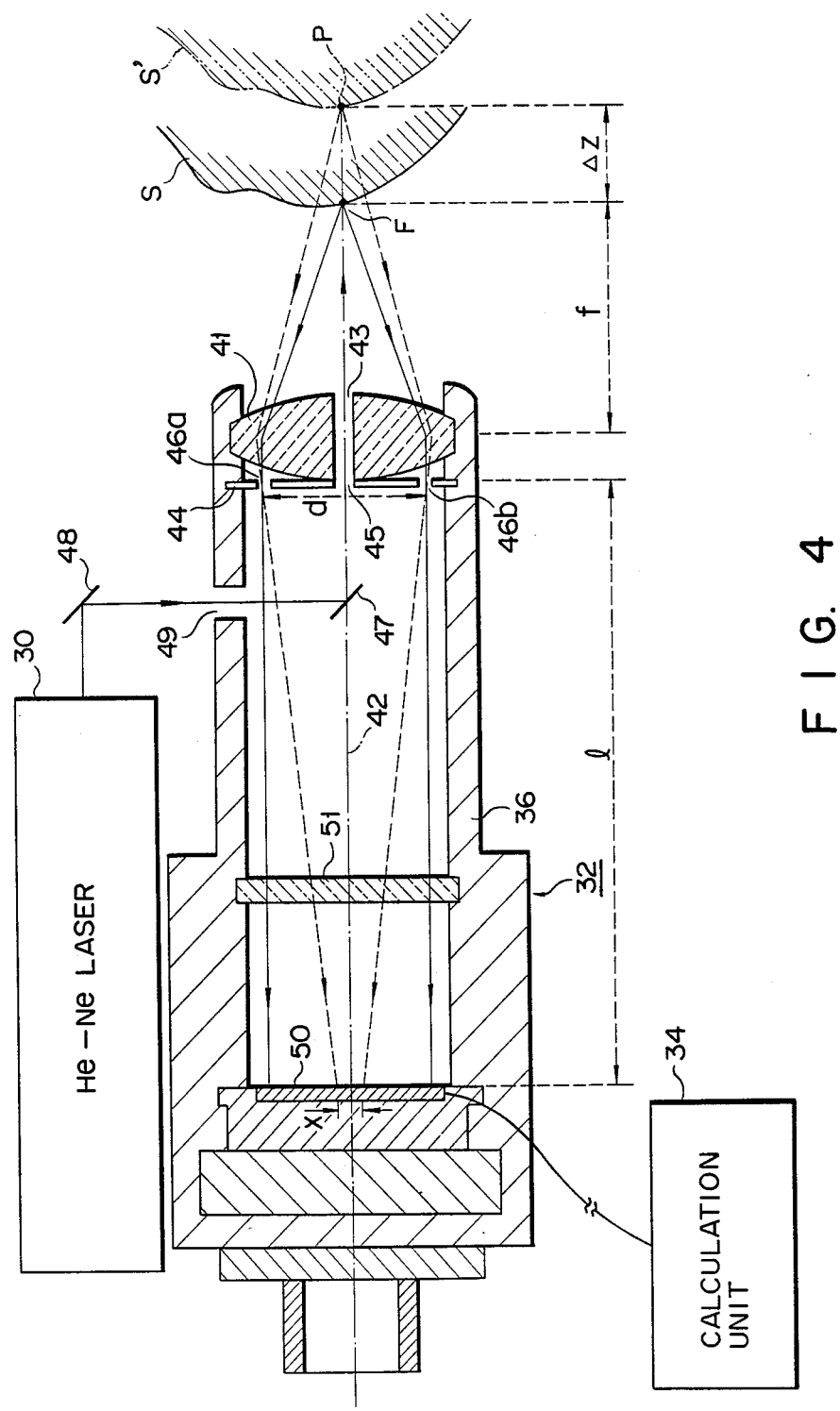
FIG. 4 is a block diagram of an optical axis displacement sensor according to a first embodiment of this invention.

As shown in FIG. 4, the sensor of this embodiment comprises a helium-neon (He-Ne) gas laser 30, a probe 32 and a calculation unit 34. On the tip portion of a housing 36 of probe 32 is a convex lens 41 provided which has at its center a hole 43 of about 3 mm diameter on an optical axis 42 and faces a target surface S for displacement measurement. The focal distance f of convex lens 41 is 36 mm.

A light shielding plate 44 is provided perpendicular to optical axis 42 on the opposite side of the target surface S with respect to convex lens 41 and close to the lens 41. Like convex lens 41, light shielding plate 44 has a hole 45 of about 3 mm diameter on optical axis 42. Light shielding plate 44 further has two parallel straight slits 46a and 46b at two sections in its periphery which corresponds to the periphery portion of convex lens 41. The slits 46a and 46b each have a width of 0.1 mm.

Figure 5:
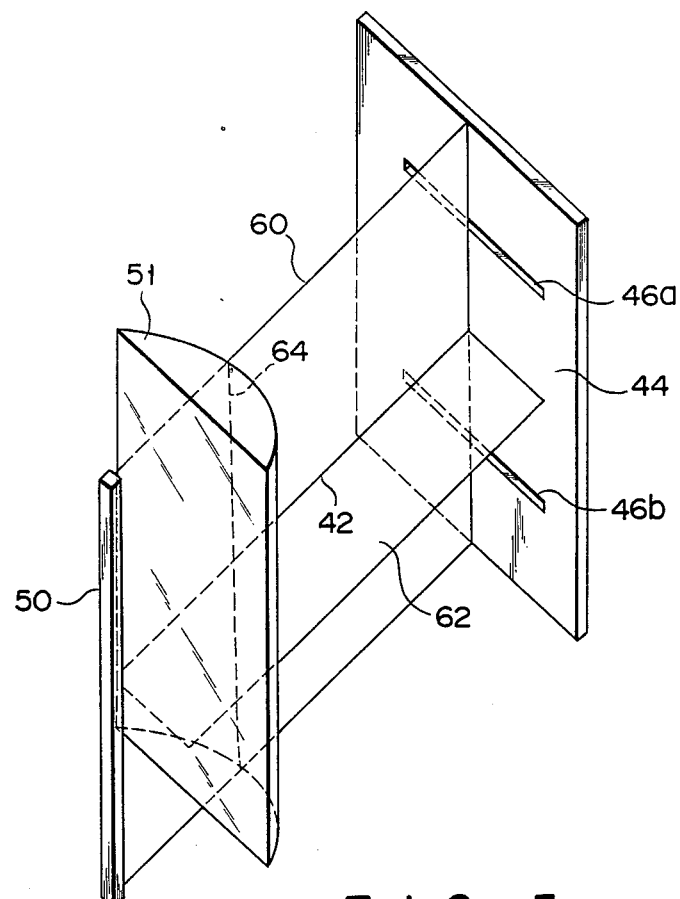
FIG. 5 is a schematic diagram illustrating the positional relationship between essential elements of an optical system shown in FIG. 4.

As shown in FIG. 5, slits 46a and 46b are arranged in symmetrical with respect to a plane 60 (hereinafter referred to as vertical symmetrical plane) 60 which includes optical axis 42. According to this embodiment, slits 46a and 46b are further symmetrical with respect to a plane (horizontal symmetrical plane) 62 which includes optical axis 42 and is perpendicular to vertical symmetrical plane 60. The interval between slits 46a and 46b is 24 mm.

The laser beam from He-Ne gas laser 30 is reflected by a mirror 48 and is incident to probe 32 in the direction normal to the optical axis through a hole 49 provided in the side wall of housing 36. This laser beam is reflected along optical axis 42 by a small mirror 47 provided on the optical axis 42, and is irradiated on target surface S through the center holes 45 and 43 of light shielding plate 44 and convex lens 41. The position of small mirror 47 is not limited to this position. It is possible to arrange small mirror 47 between convex lines 41 and target surface S or between light shielding plate 44 and convex lines 41.

The reflection light beam from target surface S is incident on a CCD line sensor 50 through convex lens 41, slits 46a and 46b of light shielding plate 44 and a cylindrical lens 51.

Cylindrical lens 51 and CCD line sensor 50 are arranged symmetrical to horizontal symmetrical plane 62. The distance l between CCD line sensor 50 and light shielding plate 44 is 100 mm. Cylindrical lens 51 has its bus 64 passing the focal point thereof arranged in parallel to CCD line sensor 50 and in vertical symmetrical plane 60.

The output of CCD line sensor 50 is supplied to calculation unit 34 where the position of one point F on target surface S (here, the displacement from the focal point of convex lens 41) is measured The operation of the sensor will now be explained.

The laser beam from He-Ne gas laser 30, which has been reflected along optical axis 42 by small mirror 47, is irradiated onto target surface S through the center hole 45 of light shielding plate 44 and the center hole 43 of convex lens 41. This laser beam is reflected at one point F on the optical axis on target surface S. The laser beams reflected from the target surface S are incident on convex lens 41, deflected there, and reach cylindrical lens 51 after passing through slits 46a and 46b of light shielding plate 44. The laser beams are then deflected by cylindrical lens 51 and are converged on CCD line sensor 50. Since parallel beams are irradiated on the optical axis of an optical system and the reflected beams are detected by another optical system but on the same optical axis, there exists no dead angle.

When the reflecting point of the laser beams on target surface S is the focal point F of convex lens 41, the beams reflected at point F and passing through slits 46a and 46b become parallel to each other as indicated by the solid lines in FIG. 4. When target surface S moves away by $\Delta z$ from focal point F, the light beams reflected at point P of the moved surface S' and passing through slits 46a and 46b are converged, as indicated by the broken lines in FIG. 4. Though not shown, when target surface S comes closer to convex lens 41 than the focal point F, the reflected beams are diverged.

When target surface S is away by $\Delta z$ from focal point F, the interval x (mm) on CCD line sensor 50 between two reflected light beams incident on the CCD line sensor after passing through slits 46a and 46b is expressed as follows, as may be understood from the description on page 8, line 1 through page 11, line 26 of the copending U.S. patent application No. 07/017,594 of the same inventor;

$$x = \{(f^2 + f \Delta z - l \Delta z)d\}/f(f + \Delta z) \quad (2)$$

Here, since it is known that $l = 100$ mm, $d = 24$ mm and $f = 36$ mm, $\Delta z$ can be attained by measuring x. This interval x can be easily attained from the peak interval of the outputs from CCD line sensor 50, as shown in FIG. 6. That is, interval x can be attained from the address of an element having a peak output, the size of one element and the pitch between elements. Therefore, calculation unit 34 calculates displacement $\Delta z$ of target surface S from focal point F of convex lens 41, using equation (2).

As explained above, according to this embodiment, the displacement can be attained from the address of that element which has the peak output of the CCD line sensor. Unlike the conventional sensor using an analog photoelectric converted output, therefore, in the sensor of this invention, the measured values do not depend on the intensity of incident light to the sensor or a variation in the amount of light, so that the measuring results have a higher reproducibility and are not influenced by the reflection factor, roughness, radius of curvature and inclination of the target surface, nor are they influenced by external noise signals. Since noncontact measurement is used, this sensor can apply to displacement measurement of a resilient member, a shift member or a material in a high temperature container, which would cause a problem in the case wherein contact measurement is used.

With focal point F of convex lens 41 as a reference, the measuring range according to this embodiment is $\Delta z = -2$ to $+22$ mm and the resolution is about 12 $\mu$m ($= 24$ mm $\div 2059$) when the CCD line sensor has 2059 elements.

In the embodiment, slits 46a and 46b are arranged to be symmetrical with respect to both of vertical symmetrical plane 60 and horizontal symmetrical plane 62. However, these slits have only to be symmetrical to vertical symmetrical plane 60 and need not be symmetrical to both the planes 60 and 62. The explanation of the above embodiment is given only with reference to a sensor for detecting the displacement of the target surface in the Z-axis direction along the irradiated laser beams; however, if this sensor is disposed on a table movable in the X and Y-axis directions and the displacement $\Delta z$ of the target surface for each of x and y coordinates is obtained, it is possible to provide three-dimensional data of the target surface.

A second embodiment will be explained with reference to FIGS. 7 to 12.

Figure 7:
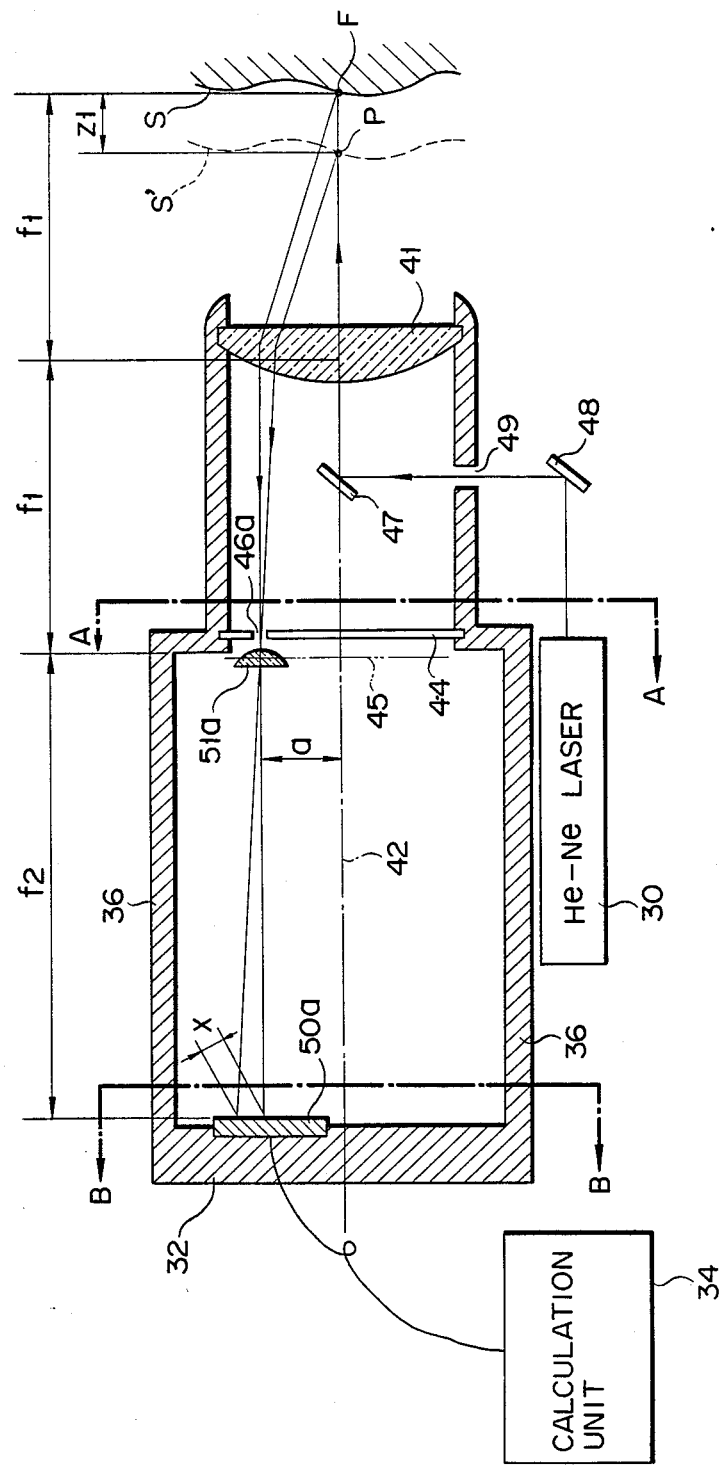
FIG. 7 is a block diagram of an optical axis displacement sensor according to a second embodiment of this invention.

As shown in FIG. 7, the sensor of the second embodiment comprises a helium-neon (He-Ne) gas laser 30, a probe 32 and a calculation unit 34. On the tip portion of a housing 36 of probe 32 is a convex lens 41 provided which faces a target surface S for displacement measurement. The focal distance f1 of convex lens 41 is 70 mm.

Figures 8A, 8B:
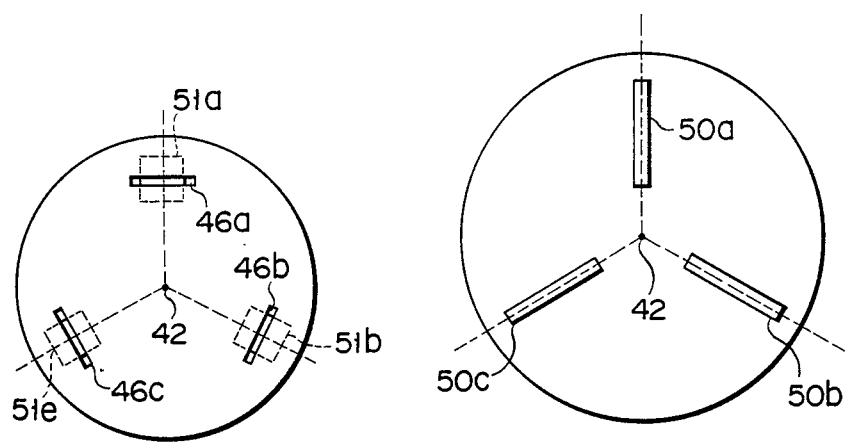
FIGS. 8A and 8B respectively shows cross sectional views of the second embodiment as viewed from lines A—A' and B—B' in FIG. 7.

Three cylindrical convex lenses 51a, 51b, and 51c are arranged on an imaginary plane 45 which is perpendicular to optical axis 42. The distance between convex lens 41 and imaginary plane 45 is f1($= 70$ mm). Lenses 51a, 51b and 51c are equidistantly positioned with each other along an imaginary circle around optical axis 42. The radius a of the imaginary circle is 20 mm. For the sake of convenience, only lens 51a is shown in FIG. 7. In FIG. 8A, three lenses 51a, 51b, and 51c are shown. The focal length f2 of lenses 51a, 51b, and 51c is 150 mm.

A light shielding plate 44 perpendicular to optical axis 42 is provided in front of imaginary plane 45. Light shielding plate 44 has three straight slits 46a, 46b, and 46c corresponding to buses of lenses 51a, 51b, and 51c which passing the focal points thereof, as shown in FIG. 8A. The slits 46a, 46b, and 46c each have a width of 1 mm.

Three CCD line sensors 50a, 50b, and 50c are arranged on a bottom wall of housing 32 corresponding to lenses 51a, 51b, and 51c, as shown in FIG. 8B. The distance between sensors 50a, 50b, and 50c and lenses 51a, 51b, and 51c is f2.

The laser beam from He-Ne gas laser 30 is reflected by a mirror 48 and is incident to probe 32 in the direction normal to the optical axis through a hole 49 provided in the side wall of housing 36. This laser beam is reflected along optical axis 42 by a small mirror 47 provided on the optical axis 42, and is irradiated on target surface S through the center holes 45 and 43 of light shielding plate 44 and convex lens 41. The position of small mirror 47 is not limited to this position. It is possible to arrange small mirror 47 between convex lens 41 and target surface S or between light shielding plate 44 and convex lines 41.

The reflection light beam from target surface S is incident on CCD line sensors 50a, 50b, and 50c through convex lens 41, slits 46a, 46b, and 46c and cylindrical lenses 51a, 51b, and 51c, respectively.

Figure 9:
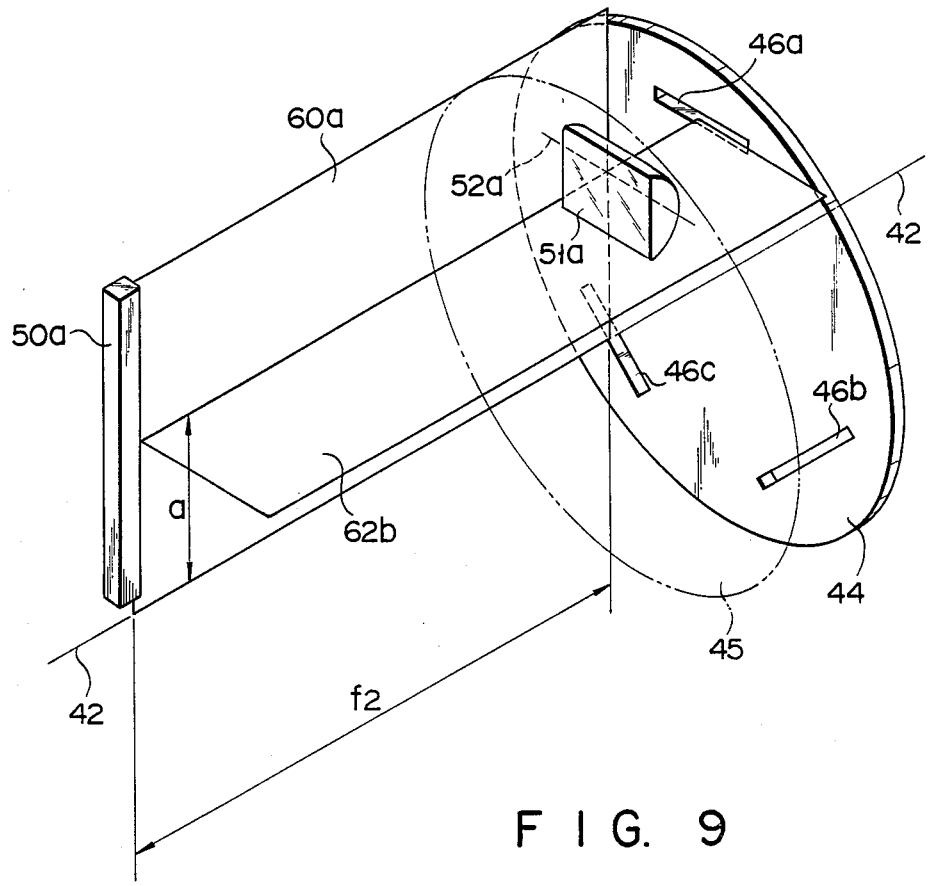
FIG. 9 is a schematic diagram illustrating the positional relationship between essential elements of an optical system shown in FIG. 4.

As shown in FIG. 9, CCD sensor 50a is arranged in a vertical symmetrical plane 60a which is normal to bus 52a of lens 51a. Slit 46a and bus 52a are arranged in a horizontal symmetrical plane 62b which is normal to vertical symmetrical plane 60a. The distance between plane 62b and optical axis 42 is a. Though not shown in FIG. 9, CCD sensors 50b and 50c are arranged in the same manner as that of CCD sensor 50a.

The outputs of CCD line sensors 50a, 50b, and 50c are supplied to calculation unit 34 where the position of one point F on target surface S (here, the displacement from the focal point of convex lens 41) is measured.

The operation of the sensor will now be explained.

The laser beam from He-Ne gas laser 30, which has been reflected along optical axis 42 by small mirror 47, is irradiated onto target surface S. This laser beam is reflected at one point F on the optical axis on target surface S. The laser beams reflected from the target surface S are incident on convex lens 41, deflected there, and reach cylindrical lenses 51a, 51b, and 51c after passing through slits 46a, 46b, and 46c. The laser beams passing through cylindrical lenses 51a, 51b, and 51c are incident on CCD line sensors 50a, 50b, and 50c. Since parallel beams are irradiated on the optical axis of an optical system and the reflected beams are detected by another optical system but on the same optical axis, there exists no dead angle.

When the reflecting point of the laser beams on target surface S is the focal point F of convex lens 41, the beams reflected at point F and passing through slits 46a, 46b, and 46c become parallel to each other as indicated by the solid lines in FIG. 7. When target surface S comes closer to convex lens 41 by Δz from focal point F, the light beams reflected at point P of the moved surface S' and passing through slits 46a, 46b, and 46c are diverged, as indicated by the broken lines in FIG. 7. Though not shown, when target surface S moves away from the focal point F, the reflected beams are converged.

Figure 10:
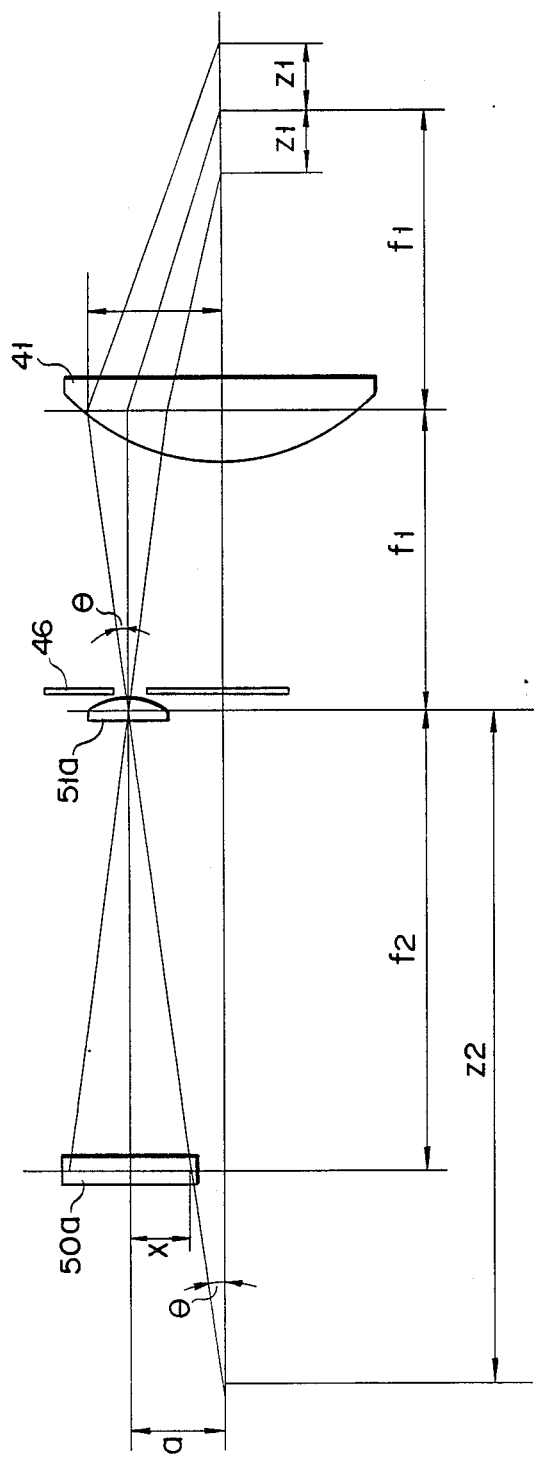
FIG. 10 shows the measurement principle of the second embodiment.

Above mentioned light beams are illustrated in FIGS. 10 and 11. As shown in FIG. 11, if the light beams incident on cylindrical lens 51a are parallel, the following equation is obtained:

$$x = f2 \cdot \tan \theta \quad (3)$$

Here, since the light beams are passed through slit 46a, the incident beams become parallel beams.

Figure 6:
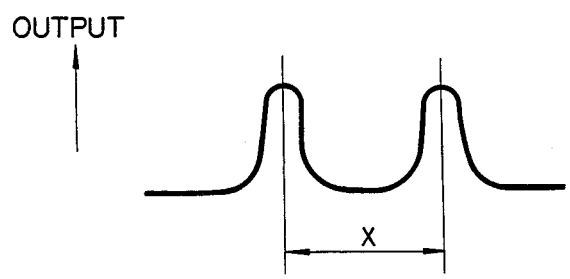
FIG. 6 is a diagram illustrating the output of a CCD line sensor used in the first embodiment.

From the similar triangular relationship shown in FIG. 6, the following equation is obtained:

$$\tan \theta = \frac{x}{f2} = \frac{a}{Z2} \quad (4)$$

From the characteristic of convex lens 41, the following equation is obtained:

$$f1^2 = Z1 \cdot Z2 \quad (5)$$

From equations (3), (4), and (5), the deviation x can be represented as follows:

$$x = \frac{a \cdot f2}{f1^2} \cdot Z1 \quad (6)$$

Equation (6) represents that the displacement Z1 of target surface S is proportional to the deviation x of a beam spot on CCD line sensor 50a.

Here, since it is known that a=20 mm, f1=70 mm, and f2=150 mm, Z1 can be calculated by measuring x.

This interval x can be easily attained from the peak interval of the outputs from CCD line sensor 50, as shown in FIG. 12. That is, deviation x can be attained from the address of an element having a peak output, the size of one element and the pitch between elements Therefore, calculation unit 34 calculates displacement Z1 of target surface S from focal point F of convex lens 41, using equation (6).

Since there are three CCD line sensors 50a, 50b, 50c and three items of data regarding to displacement of target surface S, calculation unit 34 calculates the average value of three outputs of sensors as the displacement data of target surface S. As a result, the accuracy of measurement is improved.

As explained above, according to this embodiment, the displacement can be attained from the address of that element which has the peak output of the CCD line sensor. Unlike the conventional sensor using an analog photoelectric converted output, therefore, in the sensor of this invention, the measured values do not depend on the intensity of incident light to sensor or a variation in the amount of light, so that the measuring results have a higher reproducibility and are not influenced by the reflection factor, roughness, radius of curvature and inclination of the target surface, nor are they influenced by external noise signals. Since noncontact measurement is used, this sensor can apply to displacement measurement of a resilient member, a shift member or a material in a high temperature container, which would cause a problem in the case wherein contact measurement is used.

With focal point F of convex lens 41 as a reference, the measuring range according to this embodiment is Z1 = −11.7 to +11.7 mm and the resolution is about 11.4 μm (=23.4 mm÷2059) when the CCD line sensor has 2059 elements×7 μm.

In the second embodiment, a wide measuring range can be realized by suitable changing f1 and f2 as seen from equation (6). The number of CCD line sensors is not limited to three.

As explained above, according to this invention, since light beams reflected at the target surface and passing through the slit are converged on the CCD line sensor, the displacement of the target surface becomes dependent only on the addresses of the elements of the sensor at the positions on the CCD line sensor for receiving the light beams passing through the slit. This can therefore reduce the influence of the reflection factor, roughness, radius of curvature and inclination of the target surface.

In addition, since parallel beams are irradiated on the optical axis of a lens system and the reflected beams are received near the optical axis, no dead angle occurs in displacement measurement.

Unlike the prior art, the detection of a formed image by CCD line sensor is not performed on the premise that the light intensity distribution is symmetrical with respect to the optical axis of the lens. Therefore, even if the target surface is not normal to the optical axis and the light intensity distribution is hence asymmetrical to the optical axis, the measuring results are not influenced.

Further, since non-contact measurement is used, this sensor can apply to displacement measurement of a resilient member, a shift member or a material in a high temperature container, which would cause a problem in the case where contact measurement is used.

Needless to say, the present invention is not limited to the above embodiment, but can be modified in various manners within the scope and spirit of the invention. In the embodiments, the CCD line sensor is used as a detector. However, it is possible to use other analog type or digital type detectors which can convert a position of the received beam spot into an electrical signal. Furthermore, the light source for parallel beams is not limited to the laser. The explanation of the above embodiment is given only with reference to a sensor for detecting the displacement of the target surface in the Z-axis direction along the irradiated laser beams; however, if this sensor is disposed on a table movable in the X and Y-axis directions and the displacement Δz of the target surface for each of x and y coordinates is obtained, it is possible to provide three-dimensional data of the target surface.

What is claimed is:

1. An apparatus for measuring a displacement of a target surface, comprising:
   light source means for generating parallel light beams;
   a convex lens for irradiating said parallel light beams from said light source means on the target surface;
   a light shielding plate provided perpendicular to an optical axis of said convex lens and having a straight slit;
   cylindrical lens means arranged so that a bus of said cylindrical lens means is parallel to the slit, for converging light beams which are reflected from said target surface and passed through said slit, the distance between said cylindrical lens means and said convex lens being a focal distance of said convex lens;
   light receiving means having a plurality of sensors which are arrayed in a direction perpendicular to the bus, one of said sensors receiving light beams converged by said cylindrical lens means, the distance between said light receiving means and said cylindrical lens means being a focal distance of said cylindrical lens means; and
   calculation means for detecting the distance between said one sensor receiving light beams and a predetermined sensor, and calculating the displacement of said target surface from a focal point of said convex lens, on the basis of said distance.

2. An apparatus according to claim 1, wherein:
   said calculation mean calculates a displacement Z1 from the following relationship:

$$x = \frac{a \cdot f2}{f1^2} \cdot Z1,$$

where x is the distance between said one sensor receiving light beams and a predetermined sensor, f1 is a focal distance of said convex lens, f2 is a focal distance of said cylindrical lens means, and a is a distance between said cylindrical lens means and the optical axis.

3. An apparatus according to claim 1, wherein:
   said cylindrical lens means has a plurality of cylindrical lenses, each of said cylindrical lenses is symmetrical with respect to a vertical symmetrical plane including the optical axis, the buses of said cylindrical lenses are perpendicular to the vertical symmetrical plane, a distance between focal points of said cylindrical lenses and said convex lens is a focal length of said convex lens, and each of said slits is symmetrical with respect to a vertical symmetrical plane and is positioned on a horizontal symmetrical plane including the bus of said cylindrical lens.

4. An apparatus according to claim 1, in which said predetermined sensor is a sensor to which a light beam is incident, the light beam being reflected from the object positioned at the focal length of the convex lens.

5. An apparatus according to claim 1, in which said light shielding plate has three slits which are equidistant from said optical axis and are positioned equidistant from each other along an imaginary circle around the optical axis; and said cylindrical lens means has three cylindrical lenses, each of which is arranged in correspondence with one of the three slits.

* * * * *